United States Patent [19]

Simon

[11] Patent Number: 5,046,805

[45] Date of Patent: Sep. 10, 1991

[54] TAPERED OPTICAL WAVEGUIDES FOR UNIFORM ENERGY (LIGHT) DISTRIBUTION INCLUDING ENERGY BRIDGING

[76] Inventor: Jerome H. Simon, 17 Suffolk Rd., Chestnut Hill, Mass. 02167

[21] Appl. No.: 552,904

[22] Filed: Jul. 16, 1990

[51] Int. Cl.⁵ ............................................. G02B 6/26
[52] U.S. Cl. ..................................................... 385/31
[58] Field of Search ............... 350/96.15, 96.13, 96.14, 350/96.10

[56] References Cited

U.S. PATENT DOCUMENTS

| | | | |
|---|---|---|---|
| 4,165,496 | 8/1979 | Di Domenico, Jr. et al. ... | 350/96.15 X |
| 4,865,417 | 9/1989 | Naohiro et al. .............. | 350/96.15 X |
| 4,885,732 | 12/1989 | Sunagawa et al. .......... | 350/96.15 X |
| 4,911,516 | 3/1990 | Palfrey et al. ................ | 350/96.19 |

Primary Examiner—William L. Sikes
Assistant Examiner—Phan T. Heartney
Attorney, Agent, or Firm—Jerry Cohen; Edwin H. Paul

[57] ABSTRACT

A light guide which may be bent or curved into various shapes with the light remaining in the guide, due to the refractive index difference between the guide material and the surrounding air. An opening in the guide is filled with a modifier material to allow a controlled amount of uniform light to exit into the surrounding air.

26 Claims, 11 Drawing Sheets

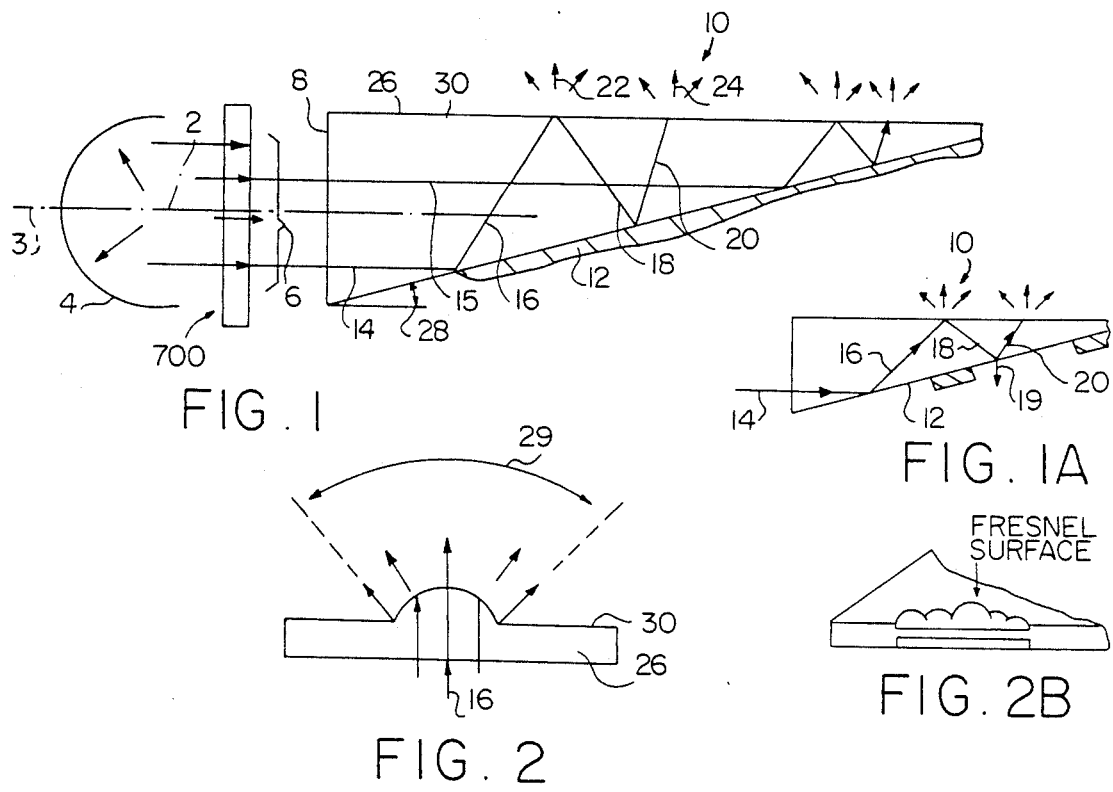
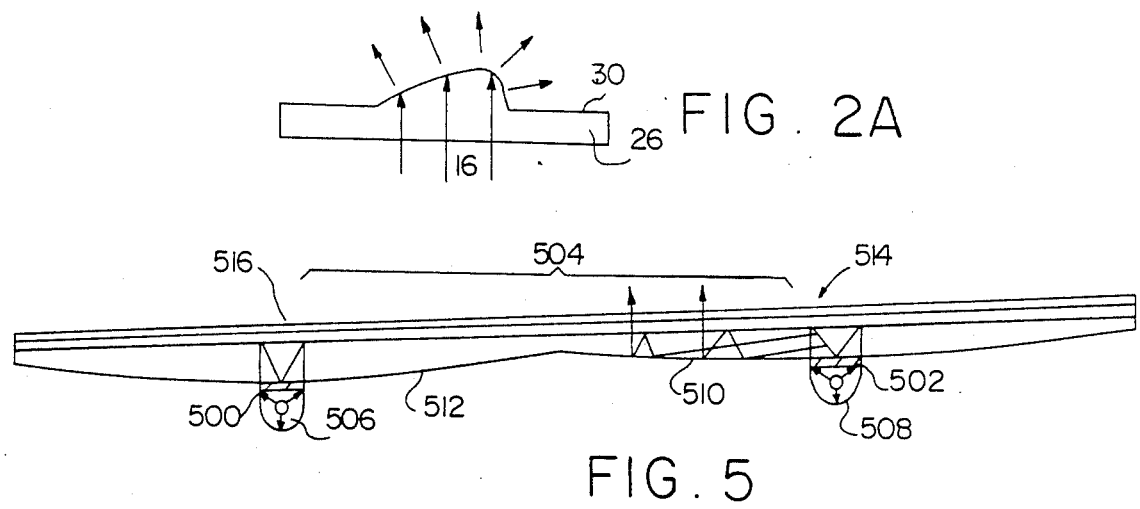

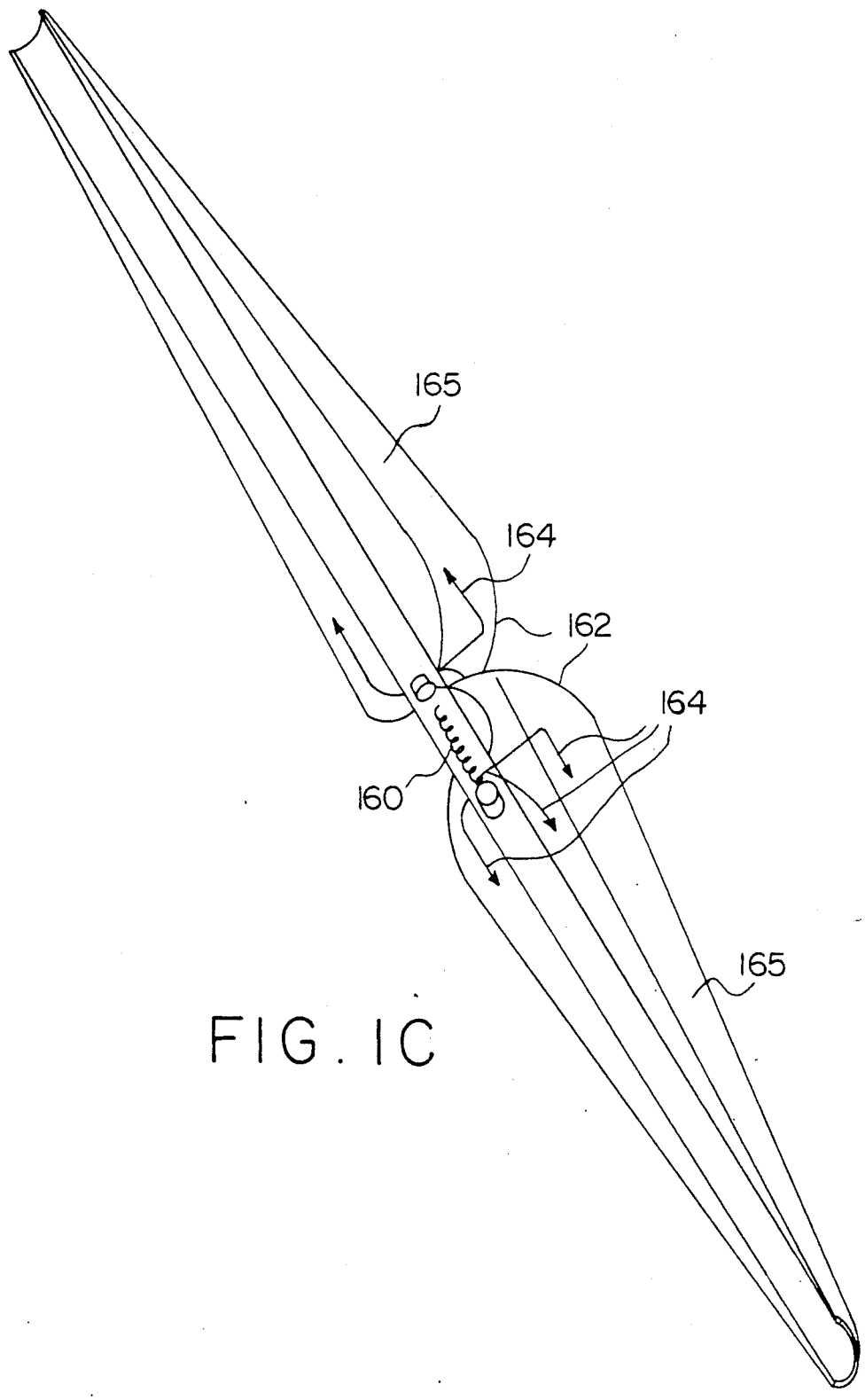
FIG. IC

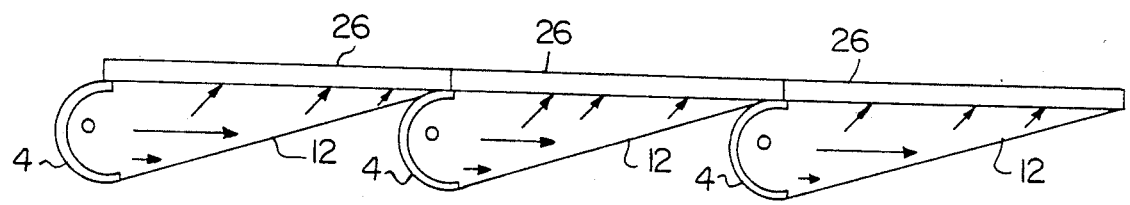
FIG. ID

TAPERED OPTICAL WAVEGUIDES FOR UNIFORM ENERGY (LIGHT) DISTRIBUTION INCLUDING ENERGY BRIDGING

FIELD OF THE INVENTION

The present invention relates in general to the distribution of electromagnetic energy, especially visible light, in uniform and controlled variations of intensity. The preferred embodiment discloses a system where the emitted energy (light) is uniform over the entire emitting surface. The form of the emitting surface is flexible, it may be constructed in many decorative and useful ways, including the use of filters for adding and blending colors.

The entire apparatus may be an inherent part of the architectural structure, whose components and materials may be part of a construction system. When optical filters and varied light sources are used, the architectural lighting designer has many options in designing systems. The flexibility of construction and form allows the lighting designer a wide range of creative applications.

BACKGROUND OF THE INVENTION

Other attempts to distribute light over the years have used fiber optics, quartz rods, tubes, diffusers and various light guides. Usually differences in refractive index contain or controllably allow the light to emerge. In all these attempts actual light distribution performance is poor and the structures unwieldly and costly.

Other techniques have used fluorescent and neon filled tubes, or films in tubular structures, which are expensive and need high voltages. Also these tubes cannot be cut or extended easily, and it is difficult to provide continuous uninterrupted light or have broad light spectra with these tubes.

In particular, an earlier attempt is found in U.S. Pat. No. 4,460,940 entitled "Apparatus for uniform illumination employing light diffuser" by Kei Mori. Mori uses non-collimated light, which enters a transmitting element, a portion is conducted to the diffusing element having a different refractive index from the transmitting element, and emerges. The combination provides that only a given wavelength emerge from the device at a particular exit. The intensity of this single wavelength emerging light at any particular exit may be uniform over the particular exit, but it will not be the same intensity as other wavelengths at other exits. This is due to the fact that the light source has differing intensity levels at differing wavelengths. In addition there is less light available as the particular exit is further away from the light source.

It is also clear that when single or few wavelength are emitted the resulting emerging light will be dim and useful for very small indicators in dark areas.

Another attempt is shown in U.S. Pat. No. 4,422,719 entitled "Optical distribution system including light guide" to Orcutt. Here noncollimated light enters a transmitting element. There is a transparent or translucent sleeve around the transmitting element having a different refractive index from the transmitting element. There will be light emerging along the entire sleeve but the intensity will decrease as the distance from the light source increases. The emitted light will not be of a uniform intensity along the optical path of the transmitting element.

In both of the Mori and the Orcutt patents the light is less intense as the distance from the source increases, hence the light emerging along the optical path is less intense than that closer to the light source. This occurs since less and less light is available as the distance increases because some has already emerged out from the apparatus. There is no mechanism to distribute the entering light proportionally along the optical path length of the system.

It is an object of this invention to overcome the limitations of the aforementioned inventions and produce an apparatus which produces uniform light intensity over the entire emitting surface.

It is another object of this invention to provide a means to mix and blend colors within the light guides of this invention.

SUMMARY OF THE INVENTION

In the present invention an electromagnetic energy, light in the preferred embodiment, wave and light condensing guide accepts energy from an entrance port. A reflective surface is constructed and distributed along the path direction of the collimated energy beam at an inclined angle to the direction of the collimated energy beam. The collimated energy is reflected by the reflective surface, the reflected energy than strikes the lower surface of a modifier element. The energy is transmitted into and through the modifier, but some of the energy may be reflected from the modifier surface. As described later there may be many successive reflections between the reflecting surface and the modifier.

The reflective surface may be a change in refractive index from one material to another, where the energy is travelling in a material with a higher refractive index and is reflected from a surface because the medium on the other side of the surface has a lower refractive index and the angle of incidence is small enough to cause the reflection. In the preferred embodiment the apparatus may be solid glass or plastic with air as the medium surrounding the apparatus, or the apparatus may be a hollow film of glass or plastic.

An object of this invention is to provide a light guide which may be bent or curved into various shapes having the light remain in the guide, due to the refractive index difference between the guide material and the surrounding air, except that an opening in the guide apparatus, the opening filled with a modifier material, will allow a controllable amount of uniform light to exit into the surrounding air.

Referring to the preferred embodiment shown in FIG. 1, the energy is light and the reflective surface is a plane inclined to the axis of the collimated light. The collimated light is proportionally incident along the length of the reflective surface, the lower light rays will only strike the first part of the reflector and the succeeding higher rays will only strike the succeeding farther parts of the reflector and the topmost rays will only strike the furthest parts of the reflector. In this way the light intensity is proportionally distributed along the reflective surface. The reflected light, which strikes the lower surface of the modifier, is also a proportional distribution of the entering collimated light. Thus the light hitting the surface of the modifier at any one point is of equal intensity, and it directly follows that the light which emerges from the exit side of the diffuser will be of equal intensity, when the modifier is uniform.

The light which is reflected from the lower surface of the modifier restrikes the reflective surface at a greater angle than at the first reflection, this light is then incident on the diffuser surface a second time, again at a greater angle. The angle of any subsequent reflections becomes greater and greater, with lessening intensity (since some light is being transmitted through the modifier) so that the light incident on any one point of the modifier surface is made up of light striking the modifier for the first time added to light which has been reflected twice consecutively up to the number of times which the geometry of the particular embodiment allows. However the salient fact is that the light hitting the diffuser surface at any one point with the first and all the multiple reflections is equal to the light hitting all other points of the diffuser surface, since the light is proportionally distributed along the reflective surface.

In practice the light is not perfectly collimated light. There is some dispersion. The preferred embodiments provide a tapered cross section guide where the cross section decreases linearly as the distance from the light source increases. The entire inside surface is reflective except for the modifier surface. The diffused light striking the sides of the guide will reflect back and forth between the reflective sides as the light travels down the guide. However, the bottom of the guide is rising and the light ray will strike the bottom and be reflected upward towards the modifier and subsequently outside. The sides are converging as the bottom is rising so that angle with which the rays strike the sides becomes larger and larger till the ray will strike a side at ninety degrees and this ray would then start back towards the source. However, since the cross section is tapered the remaining light at the end of the guide will be concentrated to compensate for the loss of intensity due to the dispersion. Curved and non linear tapers would allow special effects.

Light bridging is shown in the preferred embodiment FIG. 3B. Here two structures shown in FIG. 1B are concatenated. The area above the light source must be filled with light to produce a continuous light emitting structure across both of the wedge structures. The curved surfaces may be partially coated so that only a controlled amount of light enters the area above the curved surfaces. The light will emerge through the diffuser and will bridge the tapered or wedge structure on the left with the tapered structure on the right. In this way a continuous uniform light emitting structure is formed. In the preferred embodiment the curved surfaces are parabolic.

Light blending is shown in FIG. 5. Different color filters over the two light sources will produce a continuum of emitted light which blends from one color to the other over the distance from one source to the other.

This taper principle is applied to the generation of a uniform light emitting planar surface area as shown in the preferred embodiments depicted in FIG. 7 and 8. In this structure a uniform light is emitted over a planar surface area. The light rays, in this embodiment are traveling away from the center as the spokes on a wheel. The light intensity is decreasing inversely as the radius from the center increases. The contours of the reflective surfaces at the center, the perimeter and the surfaces 114 and 126 are constructed and arranged to counteract this decreasing intensity as the radius increases, and so produces a uniform light emitting surface.

BRIEF DESCRIPTION OF THE DRAWINGS

FIG. 1 is a view of the relationship of the collimated light to the reflective surface and modifier, and illustrates the proportional nature of the light distribution over the reflective surface and hence out from the modifier.

FIG. 1A shows an implementation where the entire apparatus is made of solid glass or plastic with a higher refractive index than the surrounding air, or a film of glass or plastic.

FIG. 1C shows a tapered guide where the cross section of the guide decreases as the distance from the source increases.

FIG. 1D shows a structure using a series of tapered optical structures concatenated to produce a long continuous light emitting surface without additional optical elements.

FIG. 2 is a cross section of the modifier element showing the distribution of light emerging.

FIG. 2A is a variation showing an asymmetrical lens formed on the modifier.

FIG. 2B shows a fresnel surface of the modifier element.

FIG. 5 shows in detail another optical structure above the light source which acts to emit uniform light intensity above the light source.

PREFERRED EMBODIMENT

Figure 1B:
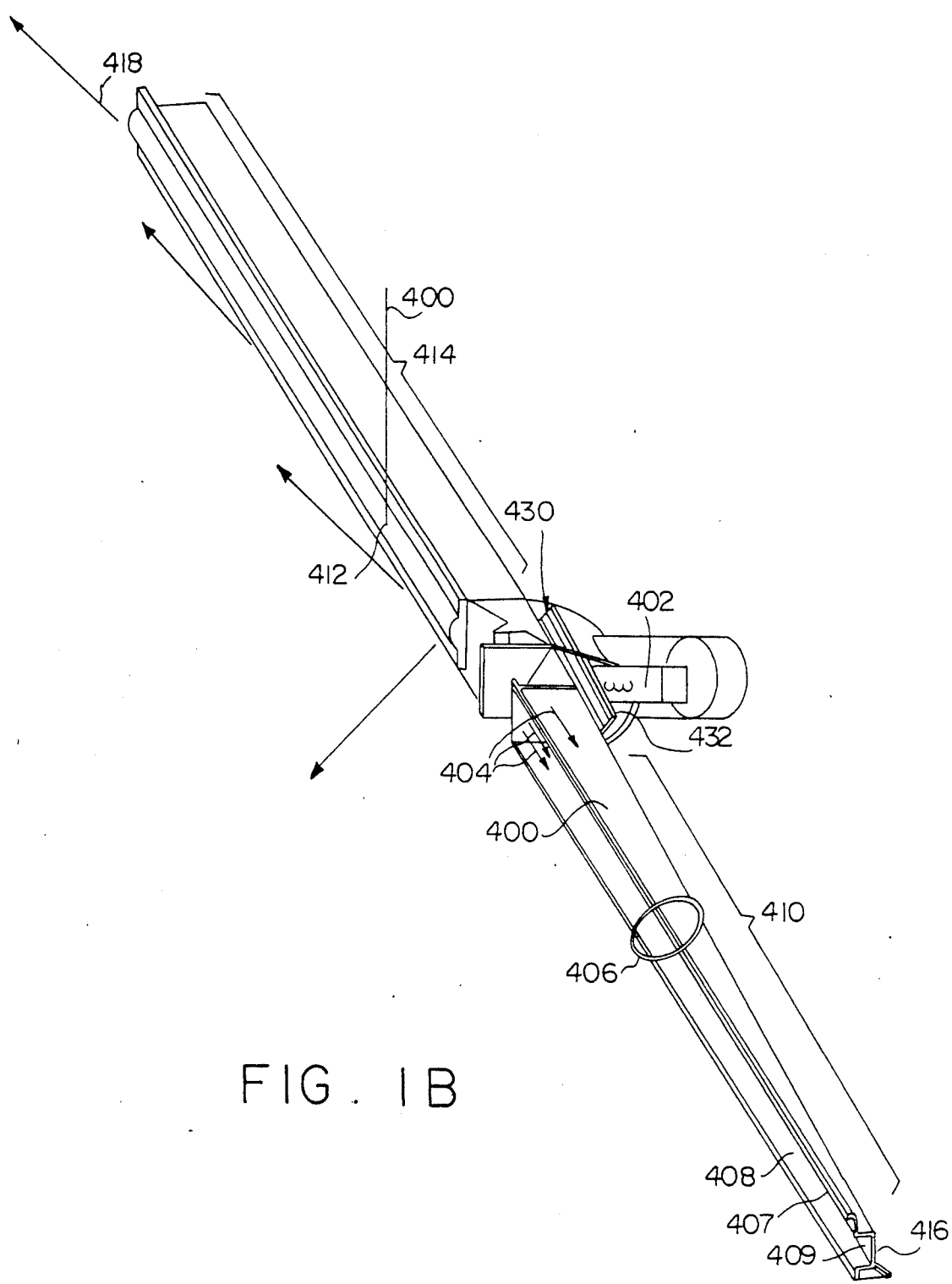
FIG. 1B shows an implementation as in FIG. 1A but expanded to two tapered guide structures with collimating surfaces.

In FIG. 1 a light source 2 together with the parabolic reflector 4 produce a collimated beam of light rays 6. These light rays are uniformly distributed over the entrance area 8 which is an entrance into the distribution apparatus 10.

A portion of the collimated light strikes the reflective surface 12. In this embodiment the reflective surface 12 is a flat plan inclined at an angle 28 to the optical axis 3; the plane is distributed along the optical axis 3 of the collimated light, such that the light will be uniformly distributed over this reflective surface 12. The lower ray 14 strikes the near part of the reflective surface 12 and the upper ray 15 strikes the reflective surface 12 proportionally farther away from the entrance port.

Consider the light to be perfectly parallel collimated beam 6 of light rays, following ray 14 will be instructive. Ray 14 is reflected from the reflective surface 12 and is labelled 16. Ray 16 strikes the modifier 26, if substantially all rays are absorbed into the modifier, then each point on the lower surface of the modifier 26 will receive one ray from the entrance port 8. The modifier is uniform in construction and each ray has equal intensity, thus the light absorbed into the modifier and the portion emitted from the top surface of the modifier 26 will be of equal intensity.

More often some of ray 16 is reflected 18 and some is transmitted into and through the modifier 26 to the outside 22. The reflected ray 18 strikes the reflector 12 at a greater angle than did ray 14, and the reflected ray 20 strikes the modifier at a greater angle than did ray 16. The resulting emerging light, in the preferred embodiments, from any given point along the exit surface 30 of the modifier, is composed of a combination of light rays which have been reflected from once to several times. The number of reflections, as shown above, depends upon the angle 28. On each reflection the angle at which any given ray strikes the reflective surface 12 increases, when that angle becomes 90 degrees the ray will reverse and create multiple reflections back towards the source. The intensity of these reverse moving reflections will have the effect of evening emitted light in the preferred embodiments herein disclosed. If the angle 28 is small there will be more reflections before the angle of a ray incident on the lower surface of the modifier 26 reaches 90 degrees.

The apparatus 10 can be made from a material different from the surrounding medium where the reflective surface may be a change in refractive index from one material to another. When the energy is travelling in a material with a higher refractive index, the energy will be reflected from a surface when the material on the other side of the surface has a lower refractive index and the angle of incidence is small enough to cause the reflection.

As shown in FIG. 1A the apparatus 10 may be glass or plastic with air surrounding the apparatus. In this embodiment the surface 12 may not be treated to cause reflections. If not then light may be lost through the surface 12 as the angle of incidence becomes greater as with ray 18. There is a minimum angle which will cause full reflections and once this angle of incidence is greater light will emerge through surface 12 as rays 19.

FIG. 1B shows an embodiment where a tapered light guide 400 extends from a light source 402. The light from the source 402 enters an optical apparatus as discussed later which sends a collimated light beam 404 down the tapered channel 406. Color filters 430 and 432 maybe used to produce different colors along the two tapered light guide arms 400 and 410. The inner surfaces 407, 408, 409 of the tapered channel are reflective and the arm 410 is shown without a modifier 412 to show the tapered channel 406. Since the light beam 404 is not perfectly collimated, there is some dispersion of the beam 404. The tapered cross section 406 decreases linearly as the distance from the light 402 increases. The light striking the sides 407 and 409 will reflect back and forth between these sides until the light strikes the rising bottom 408 as is reflected upwards toward the modifier 412 (arm 410 shown without the modifier). The tapered cross section concentrates the light remaining towards the end of the guide to compensate for the loss of intensity due to the dispersion of the light beam 404. The open top of the channel 406 is shown in arm 414 with the modifier 412 in place. The opening of the tapered channel at the end of arm 410, 416 is equal to the width of the modifier lens 418. The tapered channel 406 collects light which does not escape from the channel near the light source and allows it to escape near the ends 416 so as to produce uniform light over the entire length of the channel 406.

FIG. 1C shows an embodiment where a parabolic surface 162 is incorporated into the apparatus. In this embodiment rays 164 from a light source 160 enter and are reflected from the parabolic surface 162. These reflected rays 166 are collimated by the parabolic surface and enter a tapered solid structures 165 extending from both sides of the light 160. The light rays 164 travel down the guide 165 and interact as described in FIG. 1B.

FIG. 1D shows a system of multiple apparatuses as shown in FIG. 1. Here the modifier 26 of each individual apparatus overlaps the parabolic reflectors 4 of the adjacent apparatuses. The overlap extends until the modifiers 26 meet forming, essentially, one continuous modifier. The reflective surface 12 extends over and along the top surface of the parabolic reflectors 4 and light will reflect from the reflective surface 12 into the modifier 26 such that the entire modifier 26 of each apparatus receives light. Thus one continuous light emitting surface over all the individual apparatuses if formed.

The modifier may be a diffuser and it may have a variety of lower and upper surface characteristics. In the preferred embodiment the modifier is a diffuser. The upper surface in the preferred embodiment is a lens, as shown in FIG. 2. FIG. 2 shows a cross section of the light modifier, where the top surface is formed into a lens. This formation creates a lens which controls the distribution of the emerging light. A ray 16 strikes the lower surface of the modifier and part of the light enters the modifier 26. This light passes through the modifier and emerges from the top side. A cylindrically shaped top side will distribute the light over an angle determined by the geometry of the cylindrical lens. When the top side is flat the light will be passed directly through. As shown in FIG. 2 the angle 29 is about 90 degrees. Also the modifier may be a diffuser which will also cause the light to be directed over a wide angle 29, up to 180 degrees.

FIG. 2A shows an implementation of the modifier top surface 30 having an asymmetrical lens which creates a desired non-uniform light distribution pattern.

FIG. 2B shows a fresnel lens top surface of the diffuser.

Figure 3A:
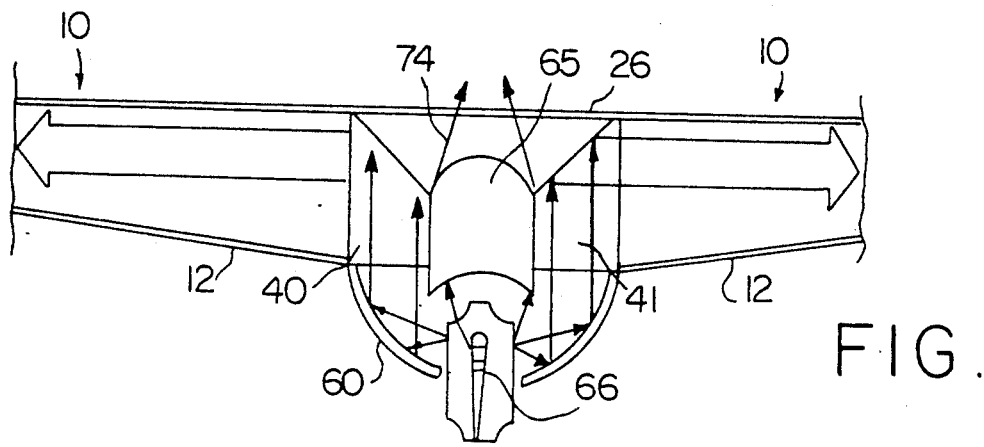
FIG. 3A shows an alternative optical arrangement to fill in the area directly above the light source.
Figure 3B:
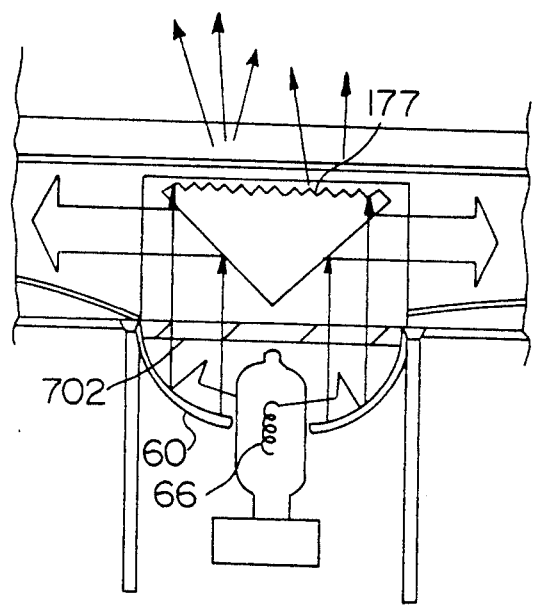
FIG. 3B is yet another alternative.
Figure 3:
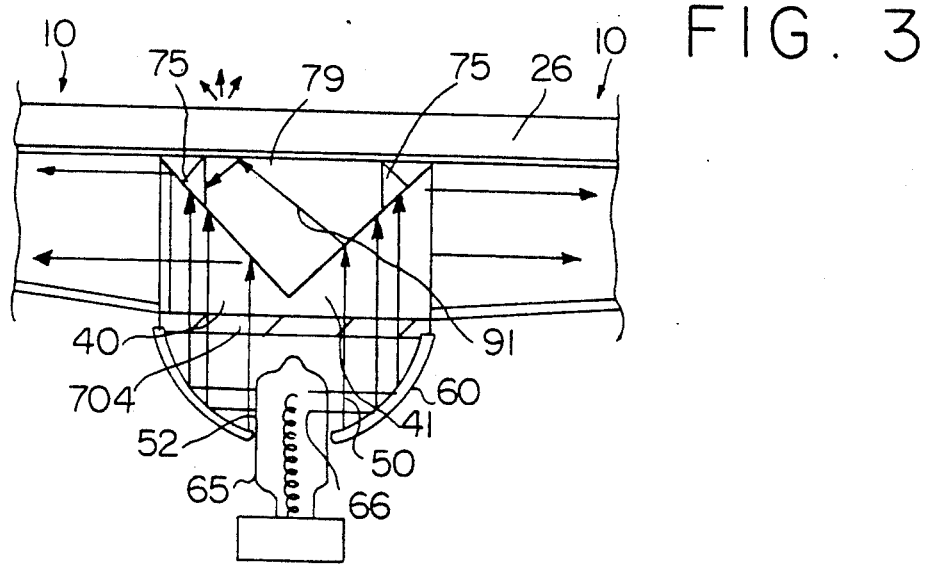
FIG. 3 is a view of an implementation of a light source, a parabolic collimater, two prisms which bends the light 90 degrees, and two light reflector distribution apparatuses. The light source is in the middle of the uniform light band emitting from the modifier element. There is an optical apparatus above each of the prisms which act to fill in the space directly above the light source.

In FIG. 3 the light source 66 sends light rays to the parabolic reflector 60 which collimates the light. The light then enters the prisms 40 and 41 where the rays are reflected from the surfaces 74 and 76 into the light distribution apparatuses 10, where the collimated rays interact with the surfaces as described in FIG. 1 above. A light ray 50 from the source 66 strikes and is reflected from the parabolic reflector 60 and is collimated as it enters the prism 41. The ray strikes the surface 76 of the prism and is reflected into the distribution apparatus 10. A similar ray 52 is collimated, enters the prism 40 and is reflected by the surface 74 and enters the distribution apparatus 10 shown on the left side of FIG. 3. The light distribution apparatuses 10 are identical to each other and are described above referring to FIG. 1. A color filter 704 maybe added to provide a given color.

The angle 77 formed where the two prisms 40 and 41 intersect can be controlled to allow some light to be refracted into the chamber 79, by coating the surfaces 74 and 76 or by use of the angles and the differences in refractive index of the prism material and the air in the chamber 79. Light ray 50 will reflect from the prism 41 surface 76 but part will enter the chamber 79 shown as ray 91. The intensity of this ray is determined by the refractive indexes of the prism 41 material, the air in the chamber 79 and the angle 77. There will be corresponding light entering chamber 79 from the prism 40. The light entering this chamber 79 strikes a modifier 26, which in the preferred embodiment is a diffuser. This diffuser 26 transmits light rays outside and reflects some back into the chamber 79. There are two small prisms 75 positioned on each surface 74 and 76. The purpose is to direct some of the rays 91 into the chamber 79 across the entire area above the light source and so fill in the area between the two arms 10. The result is a light intensity exiting from the modifier 26 which matches the exiting light intensity from the modifier 26 of the apparatuses 10, by regulating the light entering the chamber 79, the coatings on the surfaces, the refractive indexes and angles.

FIG. 3A shows another alternative configuration to have light exiting directly above the light source. In this configuration a lens 65 is placed between the two prisms 40 and 41. The effect of this lens is to accept the light rays directly from the lamp 66 and direct those rays to the modifier 26. The light through the lens 65, and light from the prisms 40 and 41, which then exits through the modifier 26, will have an intensity which matches the exiting light intensity from the top surfaces 30 of the apparatuses 10.

FIG. 3B is another variation of the embodiment shown in FIG. 3. Here the small prisms 75 in FIG. 3 are removed and a multifaceted grating 177 is used to disperse and distribute the light across the area above the light source 66 and the parabolic reflector 66. A color filter 702 may be added to provide a given color.

Figure 4:
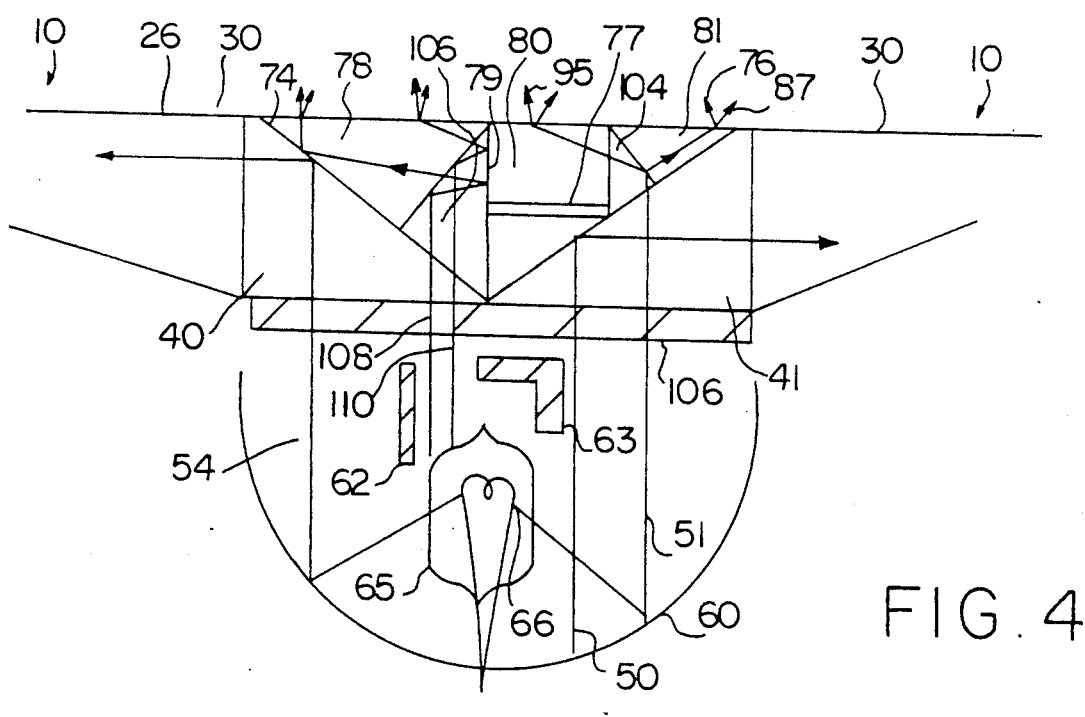
FIG. 4 shows a concatenation of two structures as shown in FIG. 3 to form a long uniform light emitting structure.

FIG. 4 shows another alternative configuration for filling with light the area directly above the light source 66. A second prism 106 is placed above the prism 40. Light enters the prism 106 as shown by rays 108 and 110. The surface 79 of the prism 106 id reflective so the rays 108 and 110 enter the chamber 78 and eventually exit through the modifier 26. On the right side of FIG. 5 ray 51 enters another prism 104 through prism 41. The ray 51 enters chamber 80 and chamber 81. The surfaces 77, 79 and 76 are reflective and the light eventually strikes the modifier and emerges 85 and 87. The emerging light intensity will match the light intensity exiting from the top surfaces 30 of the apparatuses 10. The baffles 62 and 63 are used to prevent non-collimated light from entering the apparatus, but may not be used.

FIG. 5 shows the concatenation of two structures as in FIG. 1B, end to end, forming a long continuous light bridge. In FIG. 5, for example, if a red filter 502 and a blue filter 500 are placed over the corresponding light sources 508 and 506, a color blending structure is formed. Blue light will be transmitted down the tapered optical structure 512 and red light down the tapered optical structure 510. This combination will produce a continuum of color varying from red at position 514 to blue at position 516, over the distance indicated as 504. The red and blue will blend along the distance 504 in proportion respectively to the distance from the origin of the respective light sources.

Figure 6:
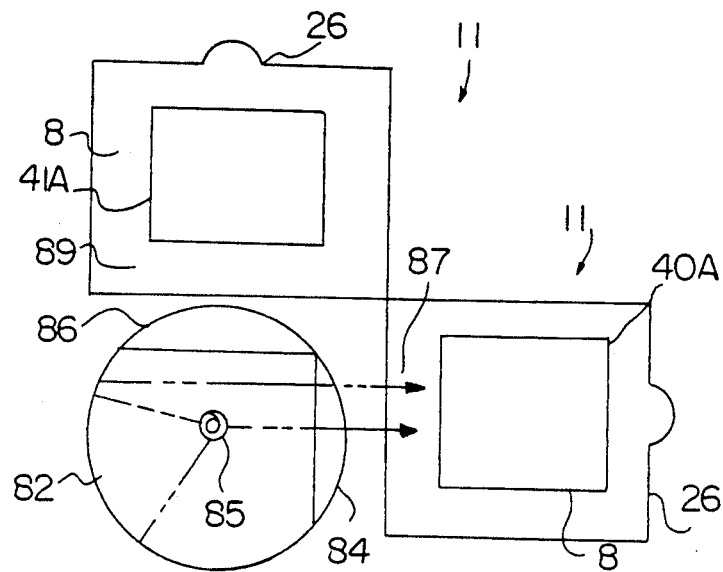
FIG. 6 shows an implementation whereby one light source sends light into two distributing apparatuses each set at right angles to each other.

FIG. 6 shows one light source 86 feeding light into two separate distributing apparatuses 11, which are at right angles to each other. Each of these apparatuses 11 are the equivalent to the system shown in FIG. 1B shown looking into the entrance of the tapered channel 406, with a prism 41A and 40A to blend the light 90 degrees into each port 8. The reflector 82 and the lens 86 and 84 produce collimated light 87 and 89 which is bent 90 degrees providing collimated light to directly enter the tapered channel of each apparatus.

Figure 7:
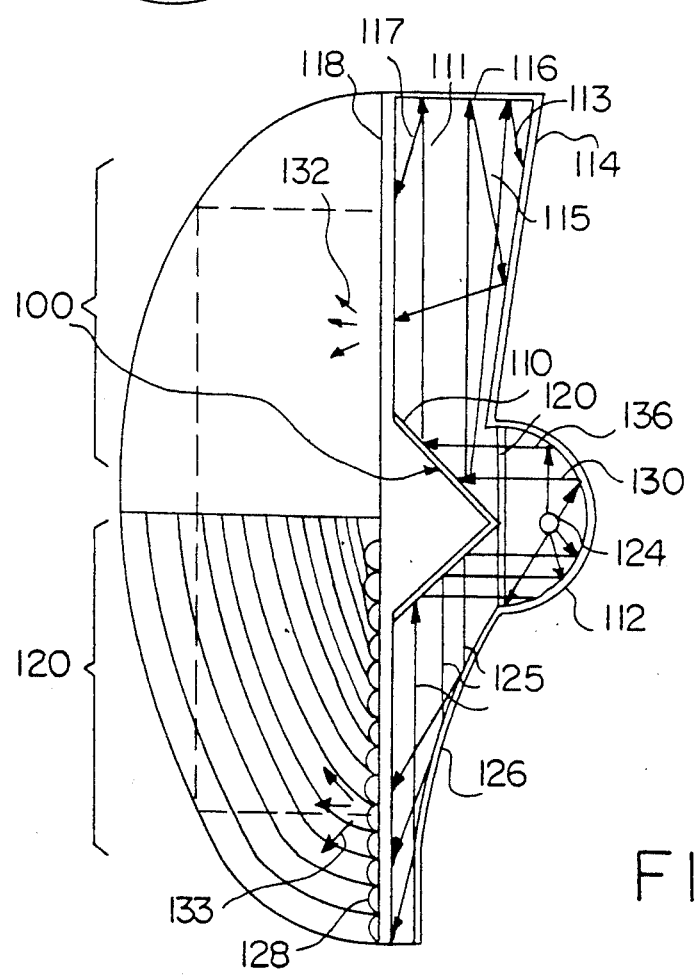
FIG. 7 are top and side cutaway view of an apparatus, using the reflective angled surface which distributes light over a flat round surface.

FIG. 7 shows a planar embodiment of this invention. The top half of the drawing 100 shows an implementation with a reverse reflective plane 114, a reflective end 116, a conical shaped mirror 110, a light source 124 and a curved reflector 112. The rays reflected from the surface 110 are traveling away from the center as the spokes on a wheel. The light intensity is decreasing inversely as the radius from the center increases. Ray 130 reflects from 110 and strikes the reflective end 116 from which it bounces and strikes the reverse reflective wedge 114. This 114 surface is a conical shape whose apex would naturally be just above the light source 124. The ray 130, after reflecting from the surface of 114 strikes a modifier 118 and exits through the modifier 118 as rays 132. The modifier 132 in the preferred embodiment being a diffuser. A provision is made for a filter or other optical element 136 to be placed in the optical path. This made be used for various effects such as specific colors. Another diffuser 134 may cover the entire apparatus. Specific operation of this mechanism to produce uniform light intensity over the entire planar surface of 132 is described as follows: The conical surface 110 reflects rays from the light source and these rays are incident upon a reflective surface 116 at the periphery. The combination of the contours of surface 116 will send some of the rays, e.g. ray 117, directly to the modifier 118, whereas other rays 113 and 115 are reflected to the reflective surface 114. The angle of the surface 114 send the rays back to strike the modifier 118 nearer the conical surface 110. The surfaces 116 and 114 are constructed to distribute the rays hitting the modifier so equal intensity occurs over the entire surface of the modifier. In the preferred embodiment the surface 116 is a curved surface which redistributes the rays back toward the conical surface 110 so as to counteract the intensity reduction due to the increasing radius. However the conical surface 110 and the surface 114 could also be curved surfaces which all together counteract the intensity reduction as the radius increases.

The surface 126 is another implementation which counteracts the intensity reduction as the radius increases. A hyperbolic surface 126 sends more of the rays 125 out towards the perimeter of the apparatus where it strikes the modifier at more distant radii. The surface 126 is designed to send more rays proportionally as the radius increases, and will counteract the decreasing effect of the radius and so produce a uniform intensity incident on the modifier 128 at all points.

The modifier 126 and 118 can be ribbed or flat as shown and will transmit through the modifier light intensity 132 and 133 of uniform intensity. The surfaces of the modifier 118 and 128 may be flat or ribbed or have other characteristics as desired. In addition a filter 136 may be used to create a given color of illumination. When filters are used on a planar grid color may blend from one grid leg to another.

Figure 8:
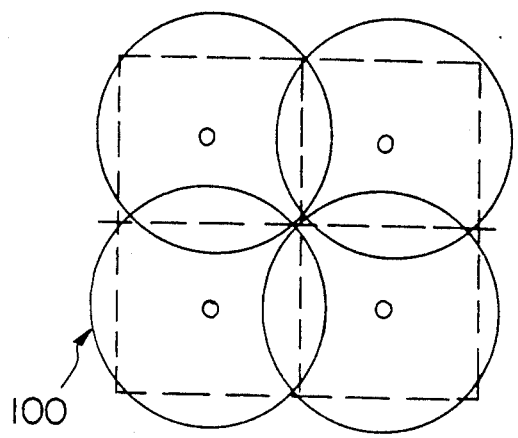
FIG. 8 shows an arrangement with a multitude of apparatuses as shown in FIG. 7.

The FIG. 8 shows a construction using four of the apparatuses shown in FIG. 7. There may be many more used to cover and illuminate large areas. The overlap areas can be made uniform by adjusting the surfaces 110, 116, 114 and 126.

Figure 9:
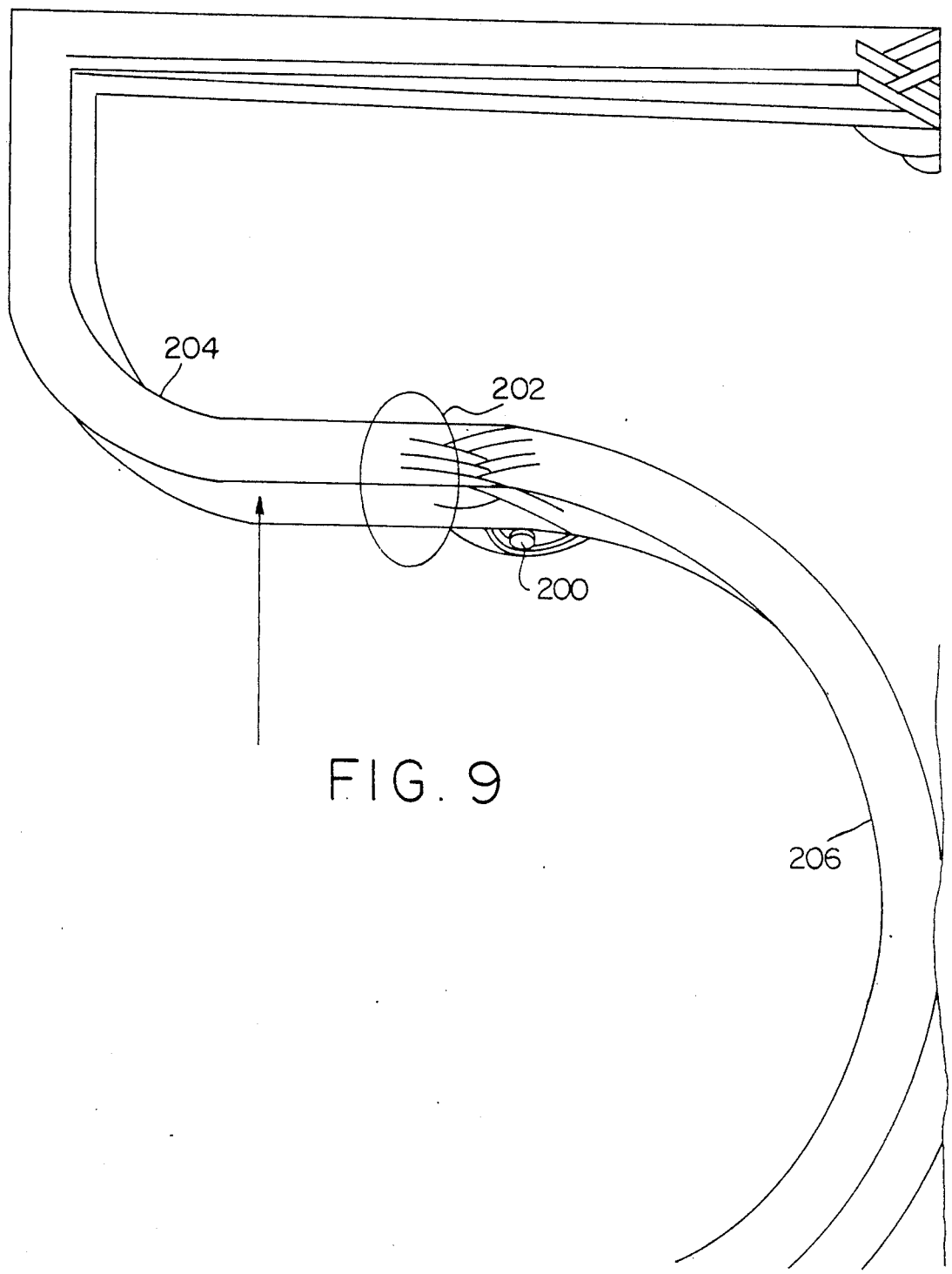
FIG. 9 shows an embodiment of multiple tapered light guides.

FIG. 9 shows an embodiment where a single light source 200 sends light into several tapered channels 202. These channels 202 are formed with bends 204 and 206. The light stays within the channels because the channels reflect the light from the inner surfaces of the channels as described in the previous embodiments.

Figure 10:
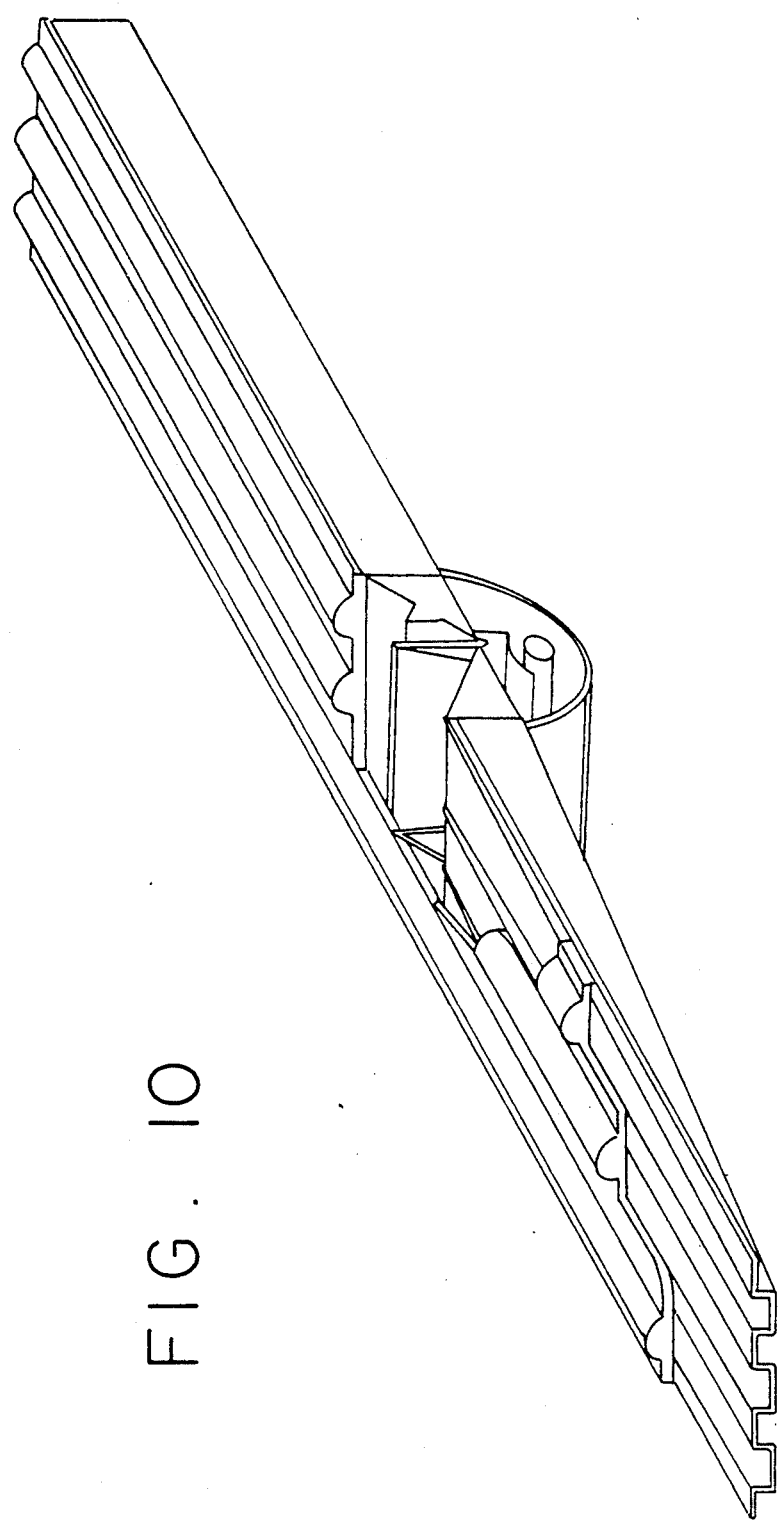
FIG. 10 shows film embodiments of a tapered light guide.

FIG. 10 shows an embodiment using multiple tapered channels, where each channel is shown in FIG. 1B.

Figure 11A:
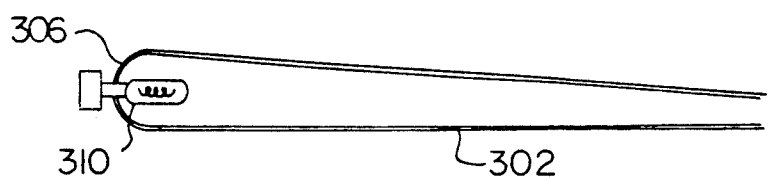
FIGS. 11 and 11A show a grid arrangement of tapered light guides.
Figure 11:
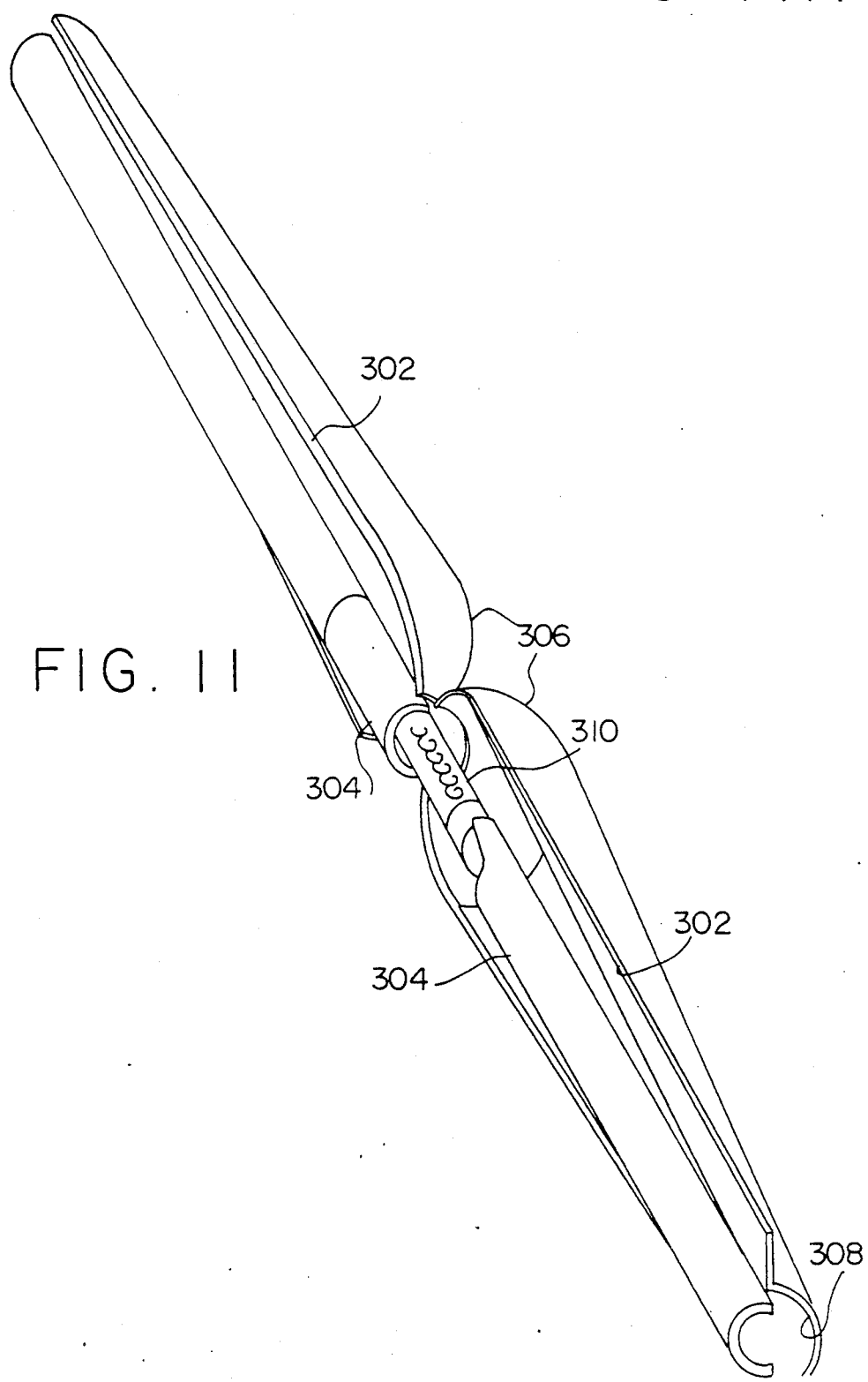

FIGS. 11, 11A and 11B shows an embodiment where the tapered guide 302 is cone structure with a cylindrical modifier 304. The light source 310 sends light into the parabolic reflectors 306 which send a collimated beam down the tapered channels 302. The inside surfaces 308 of the channel 302 are reflective providing multiple reflections as the light travels down the reflective tapered walls. The interaction of the light and the tapered channel is equivalent to that described earlier for FIG. 1B.

Figure 12A:
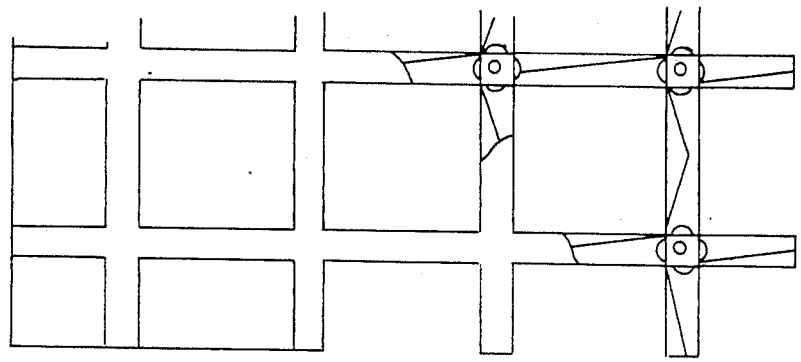
FIGS. 12 and 12A shows another multiple tapered light guide embodiment.
Figure 12:
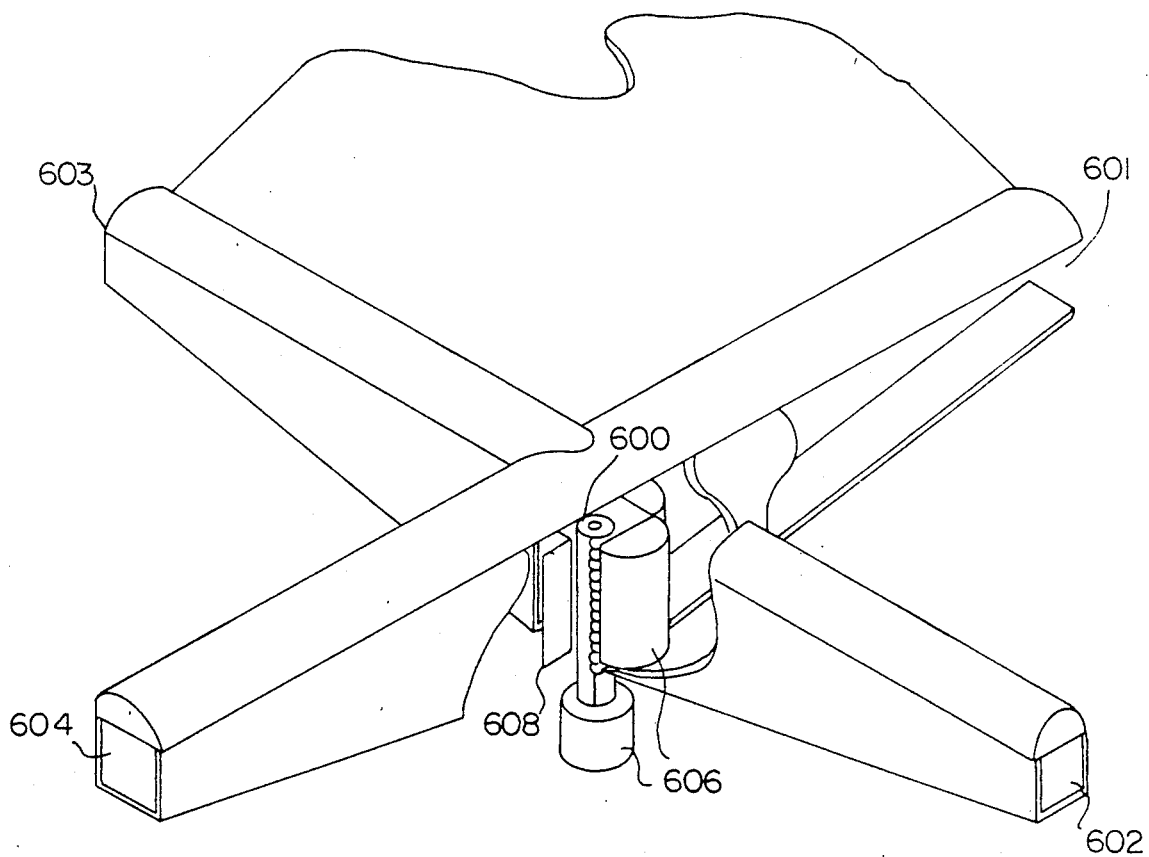

FIGS. 12 and 12A show another embodiment of a light source 600 sending light into four tapered channels 601, 602, 603, and 604. There is a cylindrical lens 606 in front of the entrance to each channel. One lens is shown cutaway 608. These lenses collimate the light entering the four tapered channel. A grid structure is shown in FIG. 11A wherein many of the structures shown in FIG. 11 are joined end to end to extend the structure as far as desired.

It will now be apparent to those skilled in the art that other embodiments, improvements, details and uses can be made consistent with the letter and spirit of the foregoing disclosure and within the scope of the patent, which is limited only by the following claims, construed in accordance with the patent law, including the Doctrine of Equivalents.

What is claimed is:

1. An electromagnetic energy waveguide for control and distribution of energy comprising in combinations:
a port which accepts collimated electromagnetic energy,
a reflective surface arranged and constructed at an inclined angle to the path direction of said collimated energy where said collimated energy strikes and is reflected from said reflective surface proportionally along the length of said reflective surface,
an energy modifier having a lower and an upper surface and arranged and constructed so that reflected energy is incident upon said lower surface and where part of said incident energy is transmitted into said modifier and emitted from said upper surface and the remaining part of said incident energy is further reflected, said further reflected part strikes said reflective surface at an angle larger than said inclined angle and is reflected and incident upon said modifier, where subsequent reflections occur along said waveguide until substantially all said incident energy is transmitted into said modifier,
said combination of said collimated energy, said reflective surface and said modifier are arranged and constructed to emit a uniform distribution of energy intensity from said upper surface of said modifier.

2. Apparatus as in claim 1 where said energy is visible light.

3. Apparatus as in claim 1 where said modifier diffuses said energy which is transmitted through said diffuser.

4. Apparatus as in claim 1 where said modifier has a lens formed on said top surface whereby the angle of said energy emitted from said top surface is distributed over an angle from 0 to 90 degrees measured from an axis normal to said top surface of said diffuser.

5. Apparatus as in claim 1 wherein said modifier is a color filter.

6. Apparatus as in claim 1 where said modifier is arranged and constructed at a second inclined angle to said path direction of said collimated energy.

7. Apparatus as in claim 1 further comprising a color filter covering said part where only energy corresponding to said filter enters and strikes said reflective surface.

8. A plurality of apparatuses as in claim 7 constructed and arranged to form a bridging system which blends uniformly from said color in one apparatus to said color in the adjacent apparatus.

9. Two apparatuses as in claim 1, constructed and arranged with the end of each apparatus opposite the light source joined to the end opposite the light source of the second apparatus, thus forming a longer uniform energy bridging system.

10. A plurality of apparatuses as in claim 1 where the modifier of the first apparatus overlaps over the parabolic reflector of the adjacent apparatus and is joined to the modifier of said adjacent apparatus, where said reflective surface of said first apparatus extends over said parabolic reflector of said adjacent apparatus, and where each successive apparatus is joined in the same fashion and said first and said adjacent apparatuses, thereby forming one continuous uniform light emitting surface.

11. Apparatus as in claim 1 further comprising an energy source and a parabolic reflector, said source and reflector constructed and arranged to produce collimated energy into said port of said distribution apparatus.

12. Apparatus as in claim 11 wherein said energy source and collimator are arranged and constructed to send collimated energy into a first prism,
said prism arranged and constructed so that said collimated energy is reflected from a surface of said first prism and where said reflected collimated energy exits said first prism and enters said port of said distribution apparatus.

13. Apparatus as in claim 12 where the collimated energy in passing through said first prism exits said first prism at an angle of 90 degrees compared to the entrance path direction of said collimated energy.

14. Apparatus as in claim 13 further comprising an optical system constructed and arranged on the opposite side of said first prism from said energy source and collimator, such that part of said energy from said light source exits directly opposite from said light source, said optical system comprises:

a second prism attached to said first prism opposite from said light source and where light enters said second prism from said first prism, where said light is further reflected in said second prism, where said light exits said second prism, a chamber which receives light from said second prism, where said light reflects multiply from the walls of said chamber, and a modifier constructed and arranged with a bottom surface and a top surface, within one of said wall of said chamber, said bottom wall to receive said energy from said chamber, and transmit said light through said modifier, said light exiting from said top surface.

15. A plurality of apparatuses as in claim 12 constructed and arranged to make a longer uniform energy distribution system.

16. A plurality of apparatuses as in claim 15, constructed arranged with said first parabolic end surfaces adjacent to each other, and where said modifier extends from each said apparatus and joins to form a continuous modifier, and wherein said first parabolic end surface of each said apparatuses is coated to allow a controlled distribution of light to be transmitted through said parabolic surface to said surrounding air, said controlled distribution formed to produce a uniform intensity of light incident upon said modifier, and where said modifier emits from said top surface of said modifier a uniform intensity of light.

17. A plurality of apparatuses as in claim 1 further comprising:

a light source positioned at the center of a flat radial arrangement of said apparatuses, each of said apparatuses positioned with said port of each said apparatus facing said light source, a corresponding plurality of lenses each positioned between said light source and said port where each lens accepts light from said source and forms a collimated light beam which is directed into each each corresponding port.

18. A light distribution system as in claim 17 where there are four apparatuses, each as in claim 1, arranged in a flat radial pattern, each said apparatus place at ninety degrees from each other, said ninety degrees measured from said path direction of said collimated light which enters into each said apparatus.

19. A plurality of light distribution systems, each as in claim 18, constructed and arranged to form a flat grid pattern.

20. An electromagnetic waveguide for control and distribution of energy rays in combination:

an object of higher refractive index than the surrounding medium, said object shaped with:

two flat sides opposite to each other, said sides constructed at an angle to each other forming a wedge structure, a lower surface an upper surface, said upper and lower surfaces connected to said sides, a first and a second end surface opposite each other, joining said sides and said upper and lower surfaces, said lower surface having adjacent to said first end surface, an entrance port surface which accepts said energy rays into said object, said first end surface having a parabolic reflective surface which collimates said rays, said lower surface having a flat surface, said flat surface being adjacent to said entrance port and extending to said second end surface between said side surfaces, said flat surface arranged and constructed at an inclined angle to the path of said collimated energy rays where said collimated rays strike and reflect from said surface, since the refractive index of said object is greater than said surrounding medium and the angle of incidence of said rays striking said flat surface is small, said ray reflection from said lower surface being proportional along the length of said flat surface, said wedge shape of said side surfaces having the apex of said wedge opposite said first end surface such that said side and said lower surface from a tapered channel extending away from said first end surface and said light source, a top surface which receives said reflected rays, said top surface coated to modify said rays and emits said rays into the surrounding air, said combination of said collimated energy rays, said flat surface and said coated top surface modifier are arranged and constructed to emit a uniform distribution of energy intensity from said top surface.

21. Apparatus as in claim 20 where said top surface is not coated further comprising:

a modifier with a top surface and a bottom surface constructed and arranged where said modifier bottom surface accepts said energy rays emitted from said top surface of said object and emits said rays from said top surface of said modifier. of each said apparatuses is coated to allow a controlled distribution of light to be transmitted through said parabolic surface to said surrounding air, said controlled distribution formed to produce a uniform intensity of light incident upon said modifier, and where said modifier emits from said top surface of said modifier a uniform intensity of light.

22. A structure as in claim 20 where the lower and side surfaces are rounded surfaces and said tapered channel forms a cone structure.

23. An electromagnetic energy waveguide for control and distribution of energy over a planar surface area comprising in combination:

a port which accepts energy rays, a inverted conical reflective surface which receives rays from said port and distributes said rays outward radially from the vertical axis of said conical surface, a top surface modifier said modifer having an upper and a lower surface, said modifer arranged to cover said round surface and be normal to said axis of said conical surface.

a curved reflective surface at the perimeter of said round area, said curved surface arranged to receive said rays reflected from said conical surface.

a curved bottom reflective surface extending outward radially from said axis of said conical surface, said curved surface rising from said entrance port to said modifier at said perimeter of said round surface, where said curved bottom reflective surface is constructed and arranged to reflect, said received rays, to said lower surface of said modifier where the distribution of said received rays is higher near the perimeter of said round surface and said distribution lowers proportionally as the distance from said center of said round surface decreases, such that the intensity of said rays incident upon said lower surface of said modifier is uniform, and where said modifier transmits said incident rays through said modifier, where rays are emitted from said upper surface of said modifier, and where said emitted rays have uniform intensity over said round surface.

24. An electromagnetic energy waveguide for control and distribution of energy comprising in combination:

a port which accepts collimated electromagnetic energy, a reflective surface, an energy modifier having a lower and an upper surface and arranged and constructed so that reflected energy is incident upon said lower surface and where part of said energy is transmitted into said modifier and emitted from said upper surface and the remaining part of said incident energy is further reflected to said reflective surface, at least one of said reflective surface and said energy modifier being arranged and constructed at an inclined angle to the path direction of said collimated energy, and wherein said collimated energy strikes said at least one of said reflective surface and energy modifier at an inclined angle and is reflected proportionally along the length of said waveguide, and wherein said further reflected part strikes said reflective surface at an angle larger than said inclined angle and is reflected and incident upon said modifier, where subsequent reflections occur along said waveguide until substantially all said incident energy is transmitted into said modifier, said combination of said collimated energy, said reflective surface and said modifier are arranged and constructed to emit a uniform distribution of energy intensity from said upper surface of said modifier.

25. Apparatus as in claim 24 wherein said reflective surface is arranged and constructed at a first inclined angle to said path direction of said collimated energy.

26. Apparatus as in claim 25 wherein said modifier is arranged and constructed at a second inclined angle to said path direction of said collimated energy.

* * * * *